(12) United States Patent
Takata et al.

(10) Patent No.: US 7,130,005 B2
(45) Date of Patent: Oct. 31, 2006

(54) CHASSIS FOR A FLAT-PANEL DISPLAY DEVICE, WHEREIN A MAIN BODY OF THE CHASSIS COMPRISING AT LEAST ONE ROUGHLY TRIANGLE OPENING WITH A THICK PART THICKER THAN SURROUNDINGS

(75) Inventors: Yoshiki Takata, Mie (JP); Yusuke Ota, Matsuzaka (JP); Katsuaki Yamada, Kashihara (JP); Kenichi Iwamoto, Ise (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/778,223

(22) Filed: Feb. 17, 2004

(65) Prior Publication Data

US 2004/0263713 A1 Dec. 30, 2004

(30) Foreign Application Priority Data

Feb. 17, 2003 (JP) .............................. 2003-038887

(51) Int. Cl.
*G02F 1/1333* (2006.01)
(52) U.S. Cl. ............................ 349/58; 361/681; 413/8; 413/9
(58) Field of Classification Search ................. 349/58; 361/681; 413/8, 9
See application file for complete search history.

(56) References Cited

U.S. PATENT DOCUMENTS

| 5,666,172 | A | * | 9/1997 | Ida et al. ..................... 349/58 |
| 5,986,726 | A | | 11/1999 | Murai |
| 5,999,238 | A | | 12/1999 | Ihara |
| 6,163,350 | A | | 12/2000 | Ihara |
| 6,219,116 | B1 | * | 4/2001 | Yuuki et al. .................. 349/58 |
| 2004/0196413 | A1 | * | 10/2004 | Satonaka ..................... 349/58 |

FOREIGN PATENT DOCUMENTS

| JP | 10-68857 A | 3/1998 |
| JP | 11-149251 A | 6/1999 |

* cited by examiner

*Primary Examiner*—Andrew Schechter
*Assistant Examiner*—(Nancy) Thanh-Nhan P Nguyen
(74) *Attorney, Agent, or Firm*—Birch, Stewart, Kolasch & Birch, LLP

(57) ABSTRACT

An object of the invention is to provide a flat-panel display device, which has a sufficient shockproof characteristic and in which the number of component parts can be reduced so as to lower in cost. A chassis for a flat-panel display device in accordance with the invention supports a component member such as a flat-panel display element 500, and is characterized in that a main body of the chassis 100 comprises a plurality of roughly triangle openings 120 at least one side of which is adjacent and roughly parallel to a side of another opening 120 or an outer edge of the main body of the chassis 100.

11 Claims, 6 Drawing Sheets

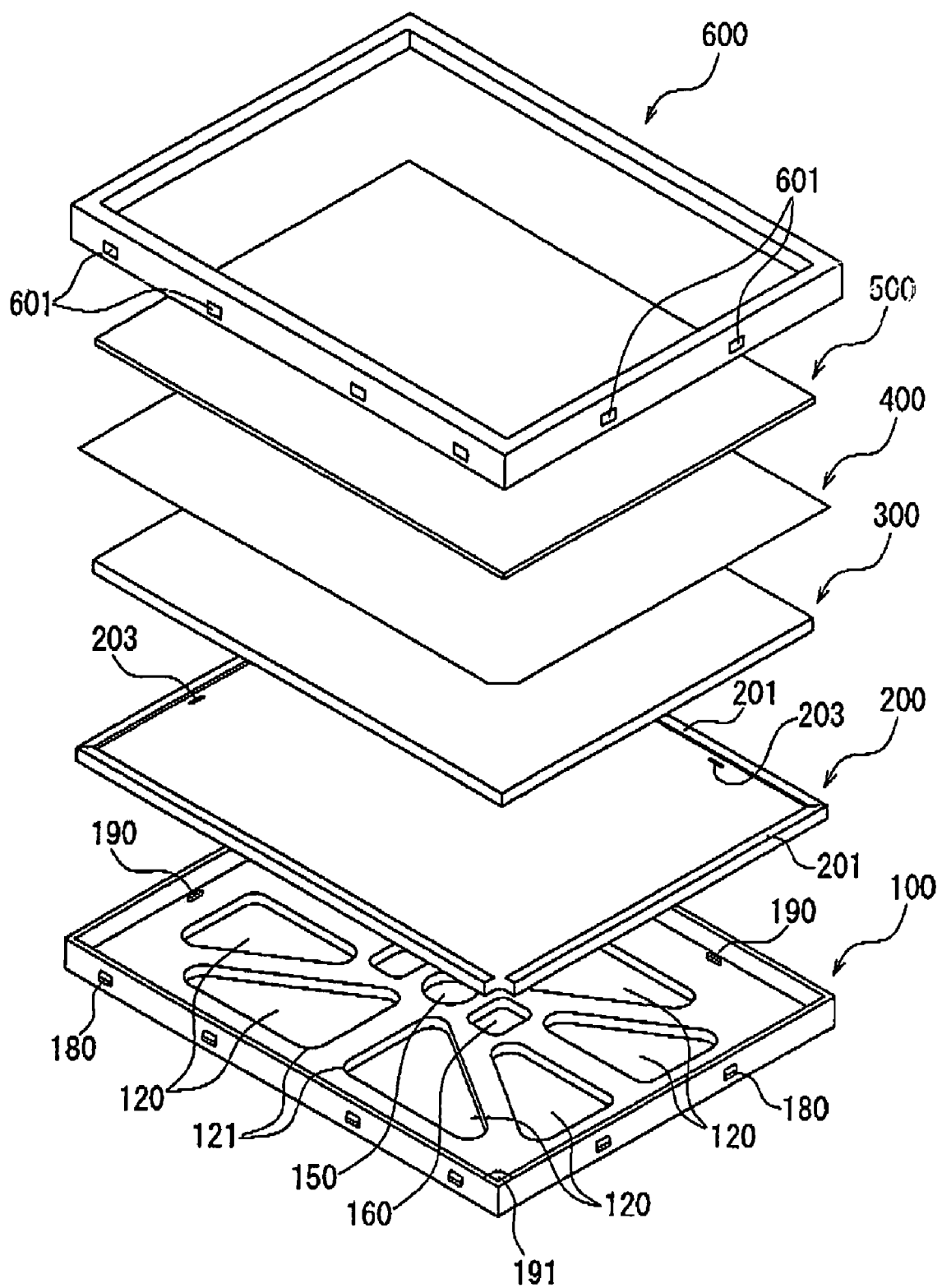
F I G. 1

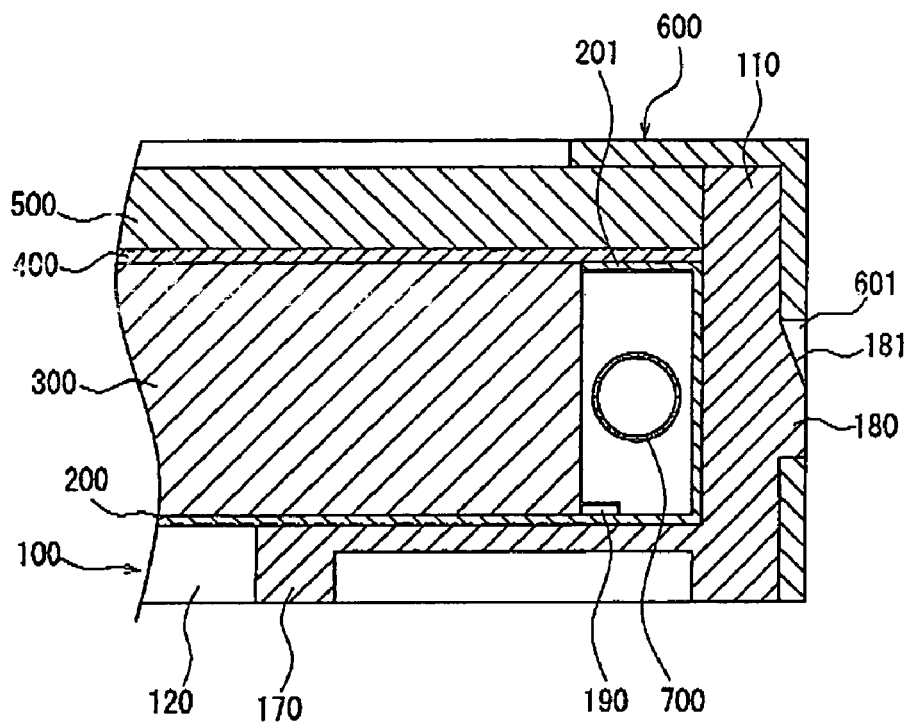
F I G. 4
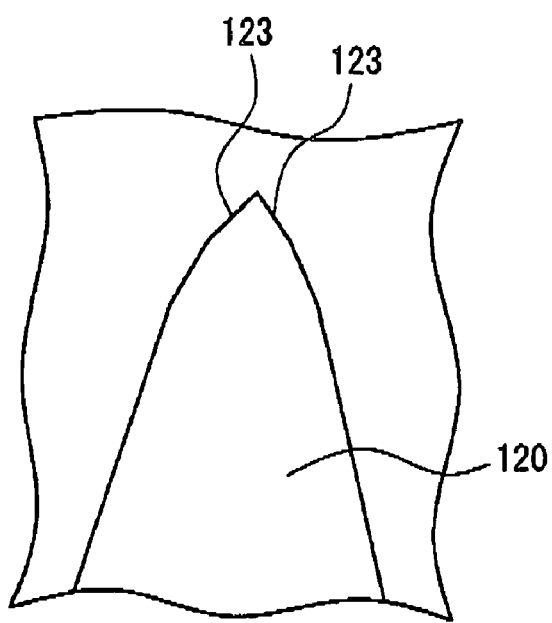
F I G. 5

CHASSIS FOR A FLAT-PANEL DISPLAY DEVICE, WHEREIN A MAIN BODY OF THE CHASSIS COMPRISING AT LEAST ONE ROUGHLY TRIANGLE OPENING WITH A THICK PART THICKER THAN SURROUNDINGS

This Nonprovisional application claims priority under 35 U.S.C. § 119(a) on Patent Application No(s). 2003-038887 filed in JAPAN on Feb. 17, 2003, the entire contents of which are hereby incorporated by reference.

TECHNICAL FIELD

The present invention relates to a chassis used for a flat-panel display device such as a liquid crystal display device, particularly to a back chassis supporting a component member such as a liquid crystal panel.

BACKGROUND ART

A known liquid crystal display device comprises, for example, a back chassis on which a light guide plate, an optical sheet and a liquid crystal displaying panel are piled in order and a bezel covering the above from the upper side thereof.

A resin chassis having a quadrangular opening is known as the above-mentioned back chassis (Japanese Patent Laid-Open No. 68857/1998, for example). There is, however, a problem that such back chassis made of resin is weak against a shock from the outside and that an inner component member is easily broken by the shock. Especially, the above-mentioned back chassis has a problem that it is easily changed in shape and broken by a shock operating in a direction that opposite apexes of the quadrangular opening are connected (in a diagonal direction).

In view of a shockproof characteristic, there is known a back chassis in which a resin chassis having a quadrangular opening and a metal plate for reinforcement, which is formed in a sheeting process, are formed into one body (Japanese Patent Laid-Open No. 149251/1999, for example). Such liquid crystal display device has a problem, however, that the number of component parts is large and the cost is high since a metal plate is used in addition to a resin chassis. Furthermore, change in shape of the metal plate by a shock is likely to disable the liquid crystal display device thereafter.

DISCLOSURE OF THE INVENTION

In view of the above, an object of the invention is to provide a chassis for a flat-panel display device, which has a sufficient shockproof characteristic and in which the number of component parts is reduced so that the cost can be lowered.

A chassis for a flat-panel display device according to the invention is used for supporting a component member such as a flat-panel display element in a display device.

The chassis for a flat-panel display device according to the invention is characterized in that a main body of the chassis comprises at least one opening having a low degree of freedom of distortion in the plane direction. The weight can be reduced since an opening are formed in the main body of the chassis. The main body of the chassis sufficient strength since the opening has a low degree of freedom of distortion in the plane direction as described above. Accordingly, a member for reinforcement is not necessarily required differently from the conventional back chassis in which a metal plate for reinforcement is provided on a resin chassis (Japanese Patent Laid-Open No. 149251/1999, for example), so that the number of component parts can be reduced, which contributes to lowering in cost. The main body of the chassis preferably has a plurality openings.

The above-mentioned opening is preferably shaped roughly triangle. A concept of the "rough triangle" includes not only triangle formed by respectively crossing three straight lines but also a shape formed by three crossing curves and a shape having a curving part or a bending line in the vicinity of an apex, for example.

Particularly, the above-mentioned roughly triangle opening preferably has a structure that a curving part is formed in the vicinity of an apex of the rough triangle so that two sides forming the apex are sequentially connected. It is thus possible to properly prevent the stress from concentrating at the apex of the roughly triangle opening. The curving part is preferably formed into an arc shape in which the curvature R is in the range expressed by the following formula:

$$R \leq [\{(-a+b+c)(a-b+c)(a+b-c)\}/\{4(a+b+c)\}]^{1/2},$$

wherein a, b and c denote the length of respective sides of a virtual triangle (a triangle formed by respectively crossing three straight lines).

The roughly triangle opening preferably has a structure that a bending line or a bent straight line forms the vicinity of an apex of the rough triangle so that two sides forming the apex are sequentially connected. It is thus possible to prevent the stress from concentrating at the apex of the roughly triangle opening.

Furthermore, at least one side of the above-mentioned roughly triangle opening is adjacent and roughly parallel to a side of another opening or an outer edge of the main body of the chassis. The chassis can thus be reduced in weight.

The opening is preferably provided with a thick part thicker than its surroundings. The strength of the chassis can be then equal to that of a chassis, which is thick in whole, while the weight of the chassis can be reduced. The above-mentioned "surroundings" means a part located on the opposite side to the opening in view from the thick part.

The main body of the chassis may be formed from a metal member. It is, however, preferable to form the main body of the chassis from resin so that the weight would be reduced. Moreover, the resin memory can return the shape of the main body of the chassis to its original state even when the main body of the chassis is somewhat changed in shape by a shock not so large that the main body of the chassis would be broken, and therefore, the flat-panel display device can be also continuously used after receiving the shock.

The main body of the chassis is preferably molded out of resin in the case that the main body of the chassis is formed from resin. The amount of the resin required to manufacture the main body of the chassis can be thus reduced, so that the cost can be further lowered.

The main body of the chassis is also preferably formed from a sintered material such as ceramic. In this case, the extremely high strength can be obtained while an effect of radiation can be also expected on the basis of good efficiency of radiation of the sintered material such as ceramic. Accordingly, it is possible to use the main body of the chassis in various fields such as space development.

There is a case that the main body of the chassis has an opening in the shape of a rough polygon (quadrangle, for example) different from a triangle in order to mount a substrate, for example. There is another case that the main body of the chassis has a roughly polygonal opening region comprising plural openings having a shape different from a rough triangle. The above-mentioned roughly polygonal opening or opening region is per se likely to be distorted in its diagonal direction. In this case, it is preferable that at least one side of the roughly polygonal opening is adjacent and roughly parallel to a part having a low degree of freedom in the plane direction (a side of the roughly triangle opening or an outer edge of the main body of the chassis). The distortion can be limited since at least one side of the rough polygon is adjacent to a part having a low degree of freedom in the plane direction. In the case of the above-mentioned structure, plural sides of the roughly polygonal opening or opening region are preferably adjacent and roughly parallel to a part having a low degree of freedom in the plane direction (a side of the roughly triangle opening or an outer edge of the main body of the chassis) so as to further limit the distortion in the plane direction. The above-mentioned "plural sides of the opening or opening region" are most preferably all of the sides forming the polygon while they are also preferably all of the sides other than a side (namely, three sides in the case of a quadrangular opening, for example). They may be all of the sides other than two adjacent sides (that is, two opposite sides in the case of a quadrangular opening, for example). The above-mentioned roughly polygonal opening or opening region is preferably provided on its edge with a thick part thicker than its surroundings.

On the main body of the chassis, preferably formed is interlocking means for a bezel so as to closely support in a direction of the thickness a component member to be supported.

Interlock of the interlocking means with a bezel allows a component member having a low degree of freedom of distortion such as a light guide plate, for example, to be closely supported in a direction of the thickness, so that the distortion of the main body of the chassis can be limited by means of the component member. That is to say, the above-mentioned component member (a light guide plate, for example) limits the degree of freedom of distortion even when the main body of the chassis is formed so as to have the thickness having a degree of freedom of distortion, so that the thickness of the main body of the chassis can be thin, and thereby, the weight can be reduced.

As described above, it is preferable to form in the main body of the chassis limiting means for limiting in a direction vertical to the thickness slide of the component member to be supported. The limiting means can thus prevent the component member (a light guide plate, for example) from sliding in the direction vertical to the thickness (in the plane direction), so that damage by a shock can be properly prevented.

The chassis described above can be used for a flat-panel display device or a chassis unit.

EFFECT OF THE INVENTION

In accordance with invention, a shape of the opening allows the degree of freedom of distortion of the main body of the chassis in the plane direction to be low and makes the strength sufficient, so that a conventional metal plate for reinforcement is not necessarily required. Therefore, the number of component parts can be reduced, which contributes to lowering in cost. Furthermore, the opening formed in the main body of the chassis allow the weight to be reduced. Particularly, at least one side of the above-mentioned roughly triangle opening is roughly parallel to a side of another adjacent opening or an edge of the main body of the chassis, so that the weight can be further reduced.

BRIEF DESCRIPTION OF DRAWINGS

FIG. 1 is an exploded perspective view of a liquid crystal display device in an embodiment according to the invention.

FIG. 4 is an enlarged sectional side view of a portion of the liquid crystal display device in the embodiment of FIG. 1.

FIG. 5 is an illustration of an alternate form for a detail of a chassis according to the invention.

BEST MODE FOR CARRYING OUT THE INVENTION

Figure 2:
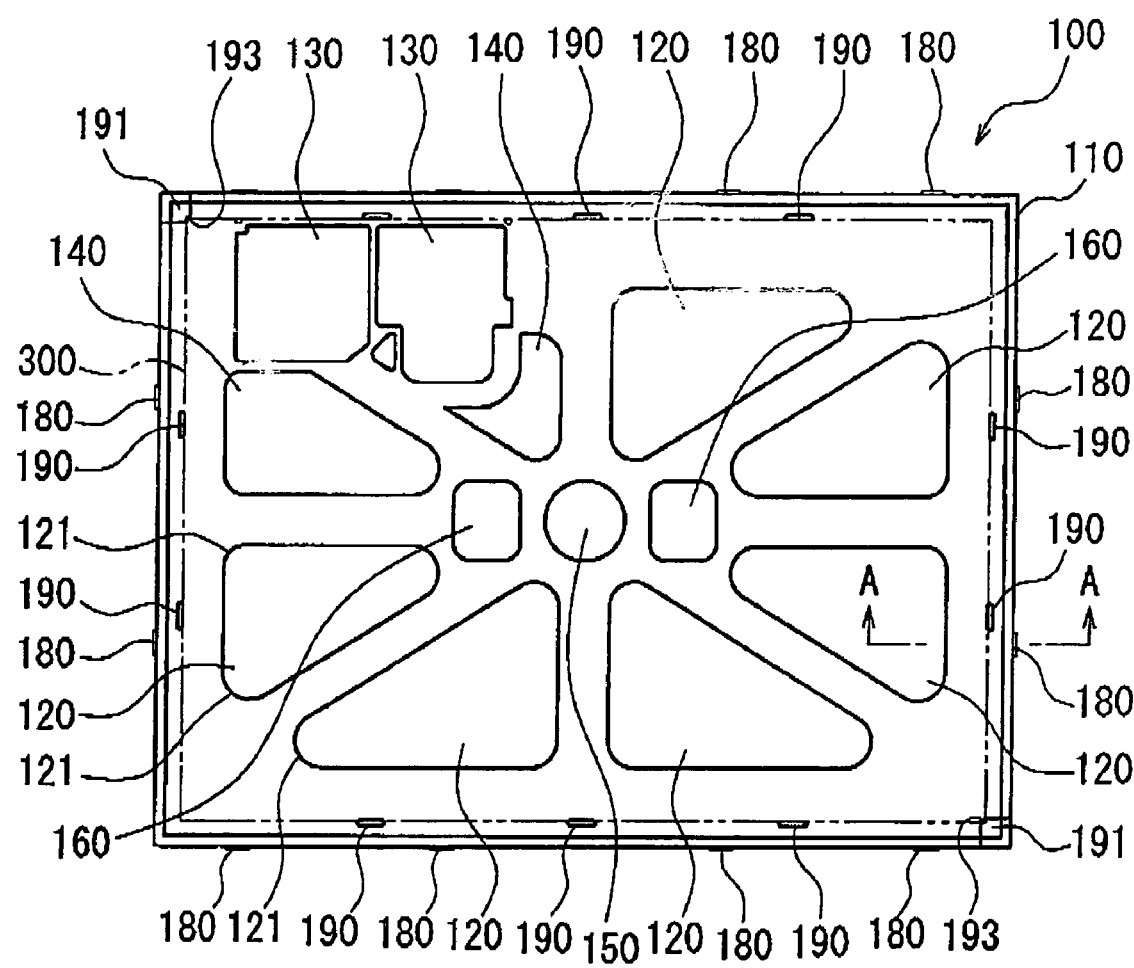
FIG. 2 is a plan view of a chassis of a liquid crystal display device in the embodiment of FIG. 1.
Figure 3:
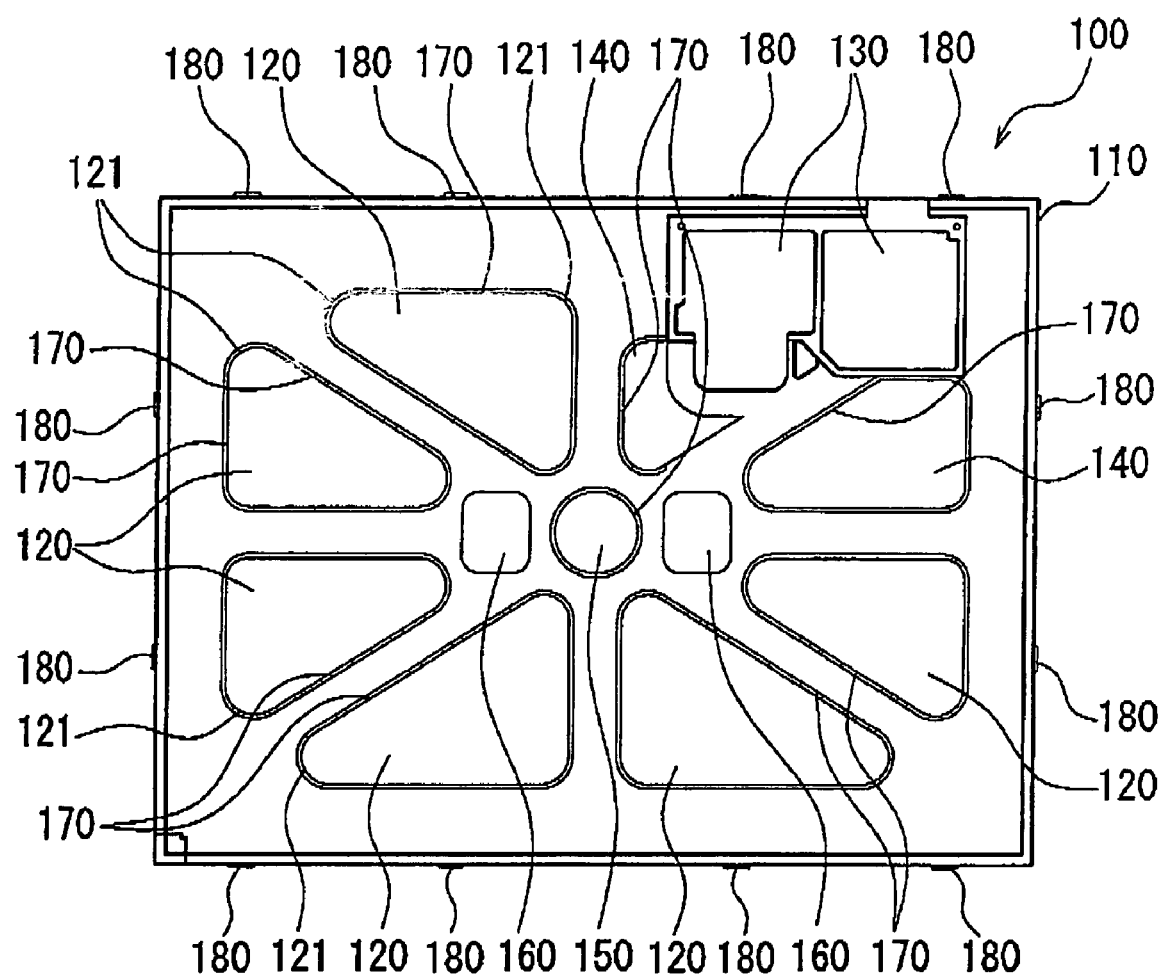
FIG. 3 is a bottom view of a chassis of a liquid crystal display device in the embodiment of FIG. 1.

In a liquid crystal display device in an embodiment according to the invention, component members such as a liquid crystal panel 500, which is a flat-panel display element, are stacked and supported on a quadrangular resin chassis 100 whose outer edge rises to the upper side, as shown in FIG. 1. In particular, a reflecting sheet 200, which is reflecting means, a light guide plate 300, an optical sheet 400 and the liquid crystal panel 500 are stacked in order and a metal bezel 600 covers the above component members from the upper side so that respective component members 200, 300, 400, and 500 are held on the resin chassis 100 in a direction of the thickness. A cold-cathode tube 700, which is a light source, is held inside a rising part 110 of the outer edge of the above-mentioned resin chassis 100 so as to oppose an edge of the above-mentioned light guide plate 300 (refer to FIG. 4). An edge 201 of the above-mentioned reflecting sheet 200 is folded back in the shape of a square bracket and the folded part 201 is provided between the cold-cathode tube 700 and the resin chassis 100 so as to operate as a reflector. In the embodiment shown in the drawings, two cold-cathode tubes 700 in the shape of L are provided (not shown in the drawings) so that light is supplied from all directions of the light guide plate 300. It is possible to optionally modify the design such that plural optical sheets 400 would be provided although only one optical sheet 400 is shown in the drawings.

The above-mentioned resin chassis 100 comprises a main body of the chassis 100, which is a component integrally molded out of resin and which has a plurality of roughly triangle openings 120 (6 openings in the embodiment shown in the drawings). The roughly triangle openings 120 are respectively in the shape of a roughly right triangle. A side of the opening 120, which forms a right angle, is adjacent and parallel to an outer edge (a rising part 110) of the main body of the chassis 100. The other sides of the roughly triangle opening 120 are arranged so as to be roughly parallel to a side of another adjacent opening.

The roughly triangle opening 120 is provided with a curving part 121 at two intersecting sides forming the apex. The curving part 121 preferably has a curvature R expressed by the following formula:

$$R < [\{(-a+b+c)(a-b+c)(a+b-c)\}/\{4(a+b+c)\}]^{1/2},$$

wherein a, b and c denote the length of respective sides of a virtual triangle (a triangle formed by respectively three intersecting straight lines).

The main body of the chassis 100 further comprises a roughly polygonal opening whose shape is different from a rough triangle. In particular, two quadrangular openings 130 are formed for mounting a substrate. One of the two openings 130 for mounting a substrate has two sides respectively adjacent and parallel to the outer edge 110 of the main body of the chassis 100 while the other has a side adjacent and parallel to the outer edge 110 of the main body of the chassis 100.

The main body of the chassis 100 is provided with two openings 140 adjacent to the above-mentioned openings 130 for mounting a substrate. The four openings 130 and 140 form "a roughly polygonal opening region formed by plural openings 130 and 140 including an opening having a shape different from a rough triangle". Two sides of the opening region are adjacent and parallel to the outer edge 110 of the main body of the chassis 100 while the other two sides are adjacent and parallel to the above-mentioned roughly triangle opening 120.

The main body of the chassis 100 further comprises a roughly circular opening 150 in its center and roughly quadrangular openings 160 on both sides of the roughly circular opening 150 in addition to the openings 120,130 and 140 described above.

The outer peripheral edges of the above-mentioned openings 120, 130, 140, 150 and 160 are provided as a thick part 170 thicker than their surroundings. The thick part 170 is formed on the bottom side of the main body of the chassis 100 as shown in FIG. 4. That is to say, the surface side of the main body of the chassis 100 on which the component members 200, 300, 400, 500 are stacked is formed to be flat while the thick part 170 is formed so as to project at the edges of the openings 120, 130, 140, 150 from the bottom side.

On the outer surface of the edge 110 of the main body of the chassis 100, is formed an interlocking means 180 for interlocking with the bezel 600. The interlocking means 180 includes a convex portion projecting outside from the edge 110 of the main body of the chassis 100. The upper side of the convex portion 180 is formed into tapered surface 181 as shown in FIG. 4. The number of the convex portions 180 formed, as shown in the drawings, is four on the longer sides and two on the shorter sides of the main body of the chassis 100.

The bezel 600 is provided with a hole 601 in a place corresponding to the above-mentioned convex portion 180. Covering the component members 200, 300, 400, 500 with the bezel 600 after the component members are stacked on the main body of the chassis 100 allows the above-mentioned interlocking means 180 to interlock using holes 601. The bezel 600 then holds the component members 200, 300, 400, 500 such as the light guide plate 300 so that the component members 200, 300, 400, 500 are pressed toward the main body of the chassis 100.

The main body of the chassis 100 further comprises limiting means 190 for limiting slide of the light guide plate 300 in a direction vertical to the thickness (in a plane direction). The limiting means 190 comprise a convex portion projecting toward the surface side (the side on which the component members are stacked) the main body of the chassis 100. The convex portion 190 projects toward the surface side so as to contact the edge of the light guide plate 300, as shown in FIG. 4. The number of the convex portions 190 formed is three on the longer sides and two on the shorter sides of the main body of the chassis 100 in the embodiment shown in the drawings.

The above-mentioned reflecting sheet 200 is provided with a hole 203 in a place corresponding to the above-mentioned convex portion 190. The convex portion 190 projects through the hole 203 of the reflecting sheet 200 so as to limit slide of the light guide plate 300.

At two opposite corners of the main body of the chassis 100, formed a convex portion 191 for positioning corners of the light guide plate 300. The light guide plate 300 is positioned by means of a depression part 193 formed in the convex portion 191 for positioning, so that the edge of the light guide plate 300 abuts against the convex portion 190, which is the above-mentioned limiting means.

In the liquid crystal display device having the above-mentioned structure in this embodiment, the opening 120 of the main body of the chassis 100 is in the shape of a rough triangle. The degree of freedom of distortion of the main body of the chassis 100 in the plane direction is thus low and sufficient strength can be obtained. Accordingly, the resin chassis 100, in which the strength does not matter conventionally or which requires a metal plate for reinforcement additionally, can support the component members 200, 300, 400, and 500, so that the number of component parts can be reduced, which contributes to lowering in cost.

The main body of the chassis 100 is integrally molded out of resin and provided with plural openings 120, 130, 140, 150 described above, and therefore, the main body of the chassis 100 can be decreased in weight while the resin material can be reduced in quantity. This contributes to lowering in cost. Particularly, the weight of the main body of the chassis 100 and the quantity of the resin material can be further reduced since each side of the roughly triangle opening 120 is adjacent and parallel to a side of another roughly triangle opening 120 or the edge 110 of the main body of the chassis 100.

The roughly quadrangular opening 130 for mounting a substrate is also adjacent and parallel to the edge 110 of the main body of the chassis 100. Moreover, the opening region including the above opening 130 for mounting a substrate is also adjacent and parallel to a side of the roughly triangle opening 120 or the edge 110 of the main body of the chassis 100. Therefore, the above place can have sufficient strength while the weight of the main body of the chassis 100 and the quantity of the resin material can be both reduced.

Furthermore, providing the thick part 170 on the peripheral edge of the above-mentioned opening 120 allows the strength to be roughly equal to that of what is thick in whole and the weight to be reduced.

The liquid crystal display device in the above-mentioned embodiment has the above-mentioned structure, which provides advantages described above. The invention is, however, not limited to the structure of the above-mentioned embodiment and can be optionally modified in design in the scope of the intention of the invention.

Although a liquid crystal display device including the liquid crystal display panel 500 is described, other flat-panel display devices, chassis used for a flat-panel display device and chassis units in which a component member such as a light source is integrated into one body with the above chassis are also in the scope of the intention of the invention.

Moreover, in the above embodiment, providing the curving part 121 in the vicinity of respective apexes of the roughly triangle opening 120 of the main body of the chassis 100 can properly prevent the stress from concentrating at the apexes, so that sufficient strength can be secured. The invention is, however, not limited to the above. It is also possible to provide in the vicinity of an apex of the rough triangle, as shown in FIG. 5, bending straight lines 123, which are connected, so as to prevent the stress from concentrating at the apex, for example. It is also possible to provide that one opening having a low degree of freedom of distortion in the plane direction is a circular opening.

Figure 6:
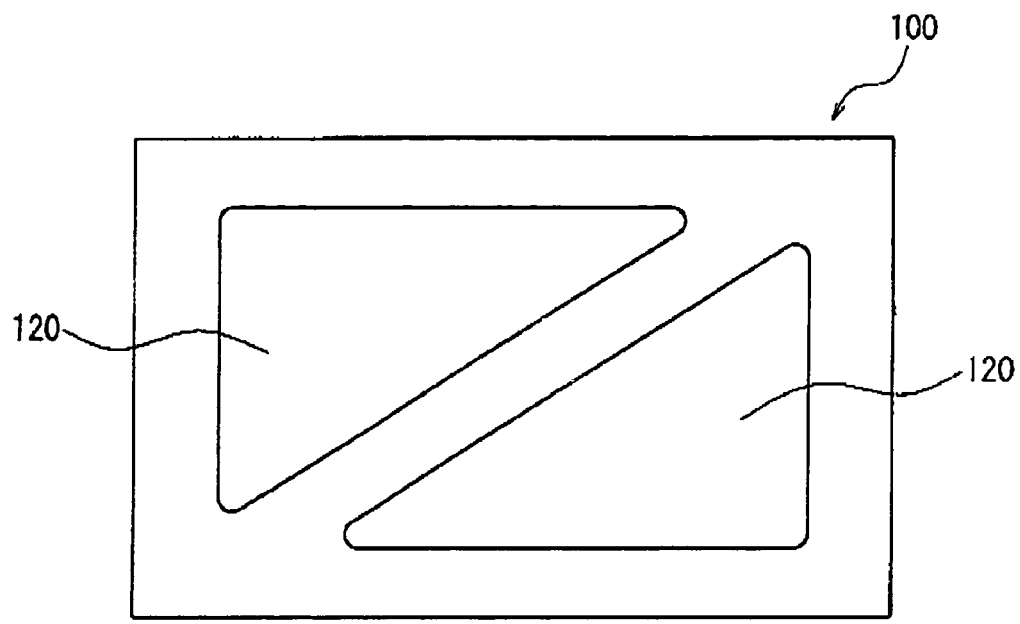
FIGS. 6–8 are views of alternative configurations of a chassis according to the invention.
Figure 7:
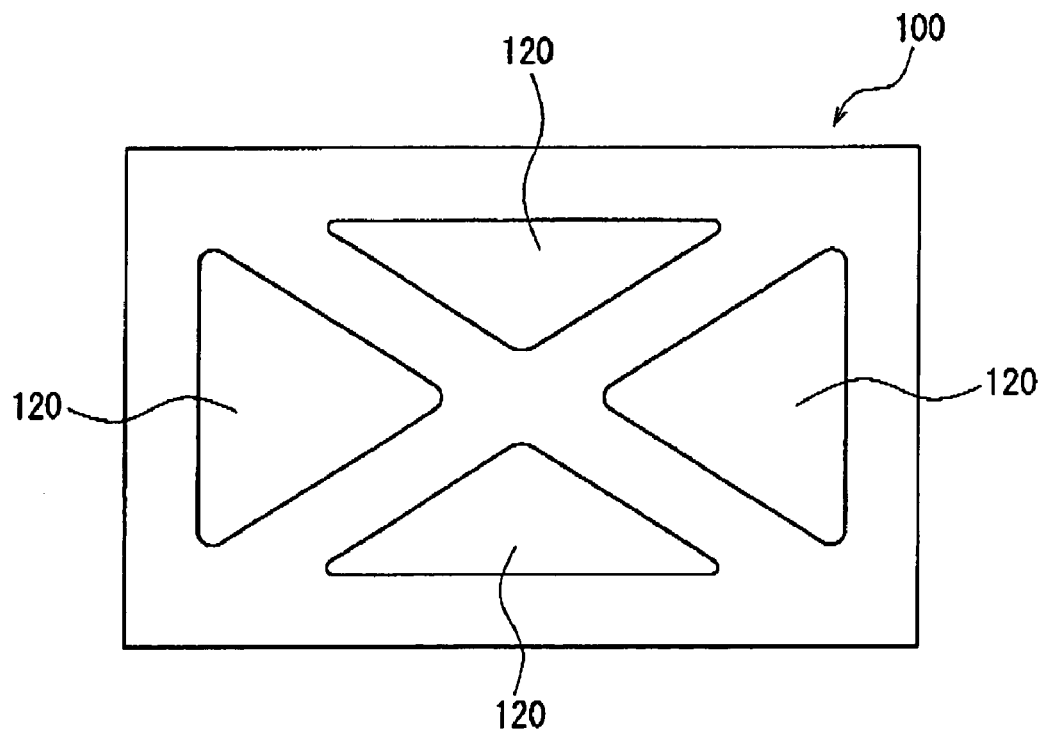
Figure 8:
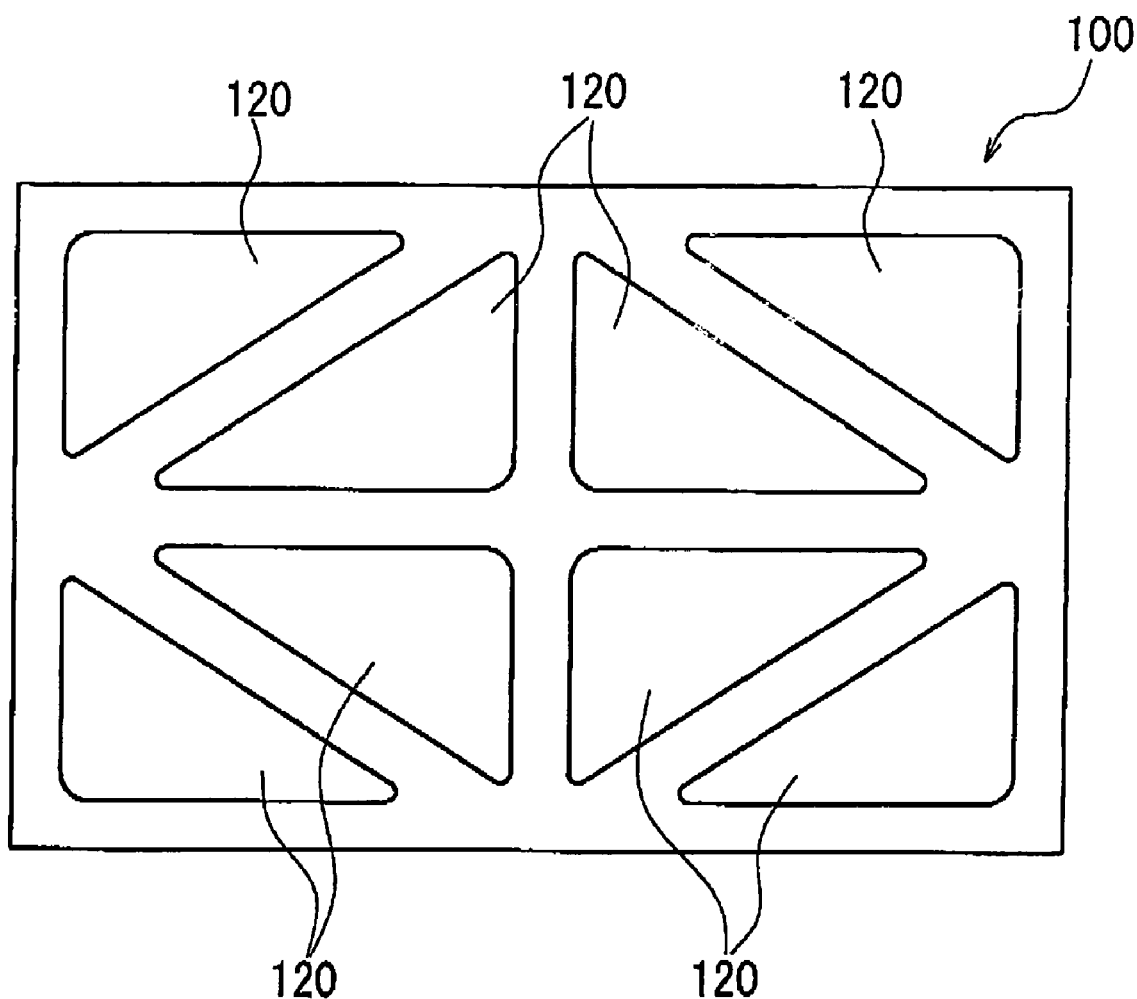

In the above-described embodiment, the main body of the chassis 100 has six of roughly triangle openings 120. The number of the roughly triangle opening 120 in the invention is, however, not limited to the above. The main body of the chassis 100 having two of roughly triangle openings 120 as shown in FIG. 6, for example, is also in the scope of the intention of the invention. The shape of the opening 120 may be a roughly isosceles triangle as shown in FIG. 7 although it is a roughly right triangle in the above embodiment. It is also possible to adopt an arrangement shown in FIG. 8 even in the case of a roughly right triangle opening 120. That is to say, the number and arrangement of a plurality of roughly triangle openings 120 are optionally modified in design in the invention.

The chassis 100 in the above embodiment comprises only a main body of the chassis, which is molded out of resin. The invention is, however, not limited to the above. The main body of the chassis 100 may be formed, in the scope of the intention of the invention, from metal, sintered material such as ceramic or at lease two kinds of material among metal, resin and sintered material such as ceramic, for example.

Furthermore, the chassis only comprises the main body of the chassis 100 and the main body of the chassis is molded into one body out of resin, in the above embodiment. The invention is, however, not limited to the above. The main body of the chassis 100 may be formed, in the scope of the intention of the invention, into one body by means of plural component parts, which are welded, screwed or interlocked, for example. These component parts can be formed from resin, metal or sintered material.

What is claimed is:

1. A chassis for a flat-panel display device, which supports a component member such as a flat-panel display element in a flat-panel display device, the chassis being characterized in that
a main body of the chassis comprises at least one roughly triangle opening, which is provided at an edge thereof with a thick part thicker than surroundings.

2. The chassis for a flat-panel display device according to claim 1, characterized in that the above-mentioned main body of the chassis has a plurality of openings.

3. The chassis for a flat-panel display device according to claim 1, characterized in that two sides forming an apex of the above-mentioned roughly triangle opening are sequentially connected.

4. The chassis for a flat-panel display device according to claim 1, characterized in that a main body of the chassis comprises a plurality of roughly triangle openings, at least one side of the above-mentioned roughly triangle opening is adjacent and roughly parallel to a side of another opening or an outer edge of the main body of the chassis.

5. The chassis for a flat-panel display device according to claim 1, characterized in that the above-mentioned main body of the chassis is formed from resin, metal, sintered material such as ceramic or at lease two kinds of material among resin, metal and sintered material such as ceramic.

6. The chassis for a flat-panel display device according to claim 1, characterized in that the above-mentioned main body of the chassis is integrated into one body.

7. The chassis for a flat-panel display device according to claim 1, characterized in that
the above-mentioned main body of the chassis comprises an opening or opening region having a degree of freedom of distortion in the plane direction that is higher than an opening having curved apexes; and that
at least one side of the above-mentioned opening or opening is adjacent and roughly parallel to a part having a lower degree of freedom of distortion in the plane direction.

8. The chassis for a flat-panel display device according to claim 1, characterized in that the above-mentioned main body of the chassis is provided with interlocking means for a bezel so as to closely support in a direction of a thickness a component member to be supported.

9. The chassis for a flat-panel display device according to claim 1, characterized in that the above-mentioned main body of the chassis is provided with limiting means for limiting slide in a direction vertical to a thickness side of the component member to be supported.

10. A flat-panel display device being characterized in that has the chassis for a flat-panel display device according to claim 1.

11. A chassis unit being characterized in that has the chassis for a flat-panel display device according to claim 1.

* * * * *